United States Patent
Lin et al.

(10) Patent No.: US 7,174,086 B2
(45) Date of Patent: *Feb. 6, 2007

(54) TRICK MODE USING DUMMY PREDICTIVE PICTURES

(75) Inventors: Shu Lin, Indianapolis, IN (US); Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 976 days.

This patent is subject to a terminal disclaimer.

(21) Appl. No.: 10/078,909

(22) Filed: Feb. 19, 2002

(65) Prior Publication Data

US 2003/0077068 A1  Apr. 24, 2003

Related U.S. Application Data

(60) Provisional application No. 60/334,914, filed on Oct. 23, 2001.

(51) Int. Cl.
*H04N 5/91* (2006.01)
*H04N 7/26* (2006.01)

(52) U.S. Cl. .......................... 386/68; 386/111
(58) Field of Classification Search ............. 386/68, 386/69, 70, 109, 111, 112, 65, 40, 124, 125, 386/6, 27, 33
See application file for complete search history.

(56) References Cited

U.S. PATENT DOCUMENTS

| 5,835,672 | A | 11/1998 | Yagasaki et al. |
| 5,867,625 | A | 2/1999 | McLaren |
| 5,922,048 | A | 7/1999 | Emura |
| 6,009,229 | A | 12/1999 | Kawamura |
| 6,034,731 | A | 3/2000 | Hurst, Jr. |
| 6,219,381 | B1 | 4/2001 | Sawada et al. |
| 6,233,392 | B1 | 5/2001 | Comer |
| 6,865,747 | B1 * | 3/2005 | Mercier ........................ 725/94 |

* cited by examiner

*Primary Examiner*—Robert Chevalier
(74) *Attorney, Agent, or Firm*—Joseph J. Laks; Robert B. Levy; Jorge Tony Villabon

(57) ABSTRACT

The invention concerns a method (200) or (300) and system (100) for performing a trick mode on a video signal containing a plurality of progressively scanned original pictures. The method (200) includes the steps of: selectively repeating (214) at least one of the original pictures to convert the video signal to a trick mode video signal in response to a trick mode command; and the step of selectively inserting (216) at least one dummy predictive picture in the trick mode video signal. In addition, the method (300) can include the step of monitoring (316) the trick mode video signal so that the dummy predictive picture is selectively inserted when the bit rate exceeds a predetermined threshold. Certain pictures in the trick mode video signal can also be modified (220) (328) to reflect an intended display order.

24 Claims, 3 Drawing Sheets

TRICK MODE USING DUMMY PREDICTIVE PICTURES

CROSS REFERENCE TO RELATED APPLICATIONS

This application is a continuation of provisional patent application Ser. No. 60/334,914, filed Oct. 23, 2001, and claims the benefit of the filing date thereof.

STATEMENT REGARDING FEDERALLY SPONSORED RESEARCH OR DEVELOPMENT (Not Applicable)

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as digital video disc (DVD) recorders or players, for purposes of viewing previously recorded programs or recording their favorite programs. Notably, the combination of a DTV (or an HDTV) and a digital video recorder or player can be an integral part of a home theater entertainment system.

A digital video recorder or player typically contains a Moving Pictures Expert Group (MPEG) decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder's or player's MPEG decoder before being displayed on the conventional television. Significantly, however, many DTV's contain their own MPEG decoders. As such, if a digital video recorder or player is connected to a DTV, the video signal read from the disc is remotely decoded by the DTV's decoder. This configuration can be referred to as a remote decoder arrangement.

There is, however, an important disadvantage to decoding digitally encoded signals with a remote DTV decoder. Namely, it is very difficult to perform trick modes in this type of arrangement. A trick mode can be any playback of video in which the playback is not done at a normal speed or in a forward direction. Oftentimes, a trick mode involves repeating a number of pictures in a video signal such as during a slow motion trick mode. As the bandwidth between the digital video recorder or player and the DTV is limited, repeating pictures in the signal being fed to the DTV may cause the signal to exceed the maximum bit rate limit of the transmission channel. The problem is even more acute if the pictures are intra (I) pictures or predictive (P) pictures, as these pictures are generally encoded with more bits than the average picture. Thus, a need exists for a method and system for performing a trick mode in a remote decoder arrangement without exceeding a maximum bit rate limit and without increasing system costs or complexity.

SUMMARY OF THE INVENTION

The present invention concerns a method of performing a trick mode on a video signal containing a plurality of progressively scanned original pictures. The method includes the steps of: in response to a trick mode command, selectively repeating at least one of the original pictures to convert the video signal to a trick mode video signal; and selectively inserting at least one dummy predictive picture in the trick mode video signal. In one arrangement, the method can also include the steps of: monitoring the trick mode video signal; and selectively inserting at least one dummy predictive picture in the trick mode video signal if the bit rate of the trick mode video signal exceeds a predetermined threshold.

In another arrangement, each of the plurality of original pictures can contain a display indicator, and the method can further include the step of selectively modifying the display indicator of at least a portion of the plurality of original pictures to reflect an intended display order when an original picture is repeated or when a dummy predictive picture is inserted in the trick mode video signal. In one aspect, the display indicator can be a temporal reference field. In addition, each temporal reference field can have an integer value, and the step of selectively modifying the temporal reference field of at least a portion of the plurality of original pictures can include the step of incrementally increasing by one the integer value of the temporal reference field each time an original picture is repeated and each time a dummy predictive picture is inserted in the trick mode video signal. In another aspect, each dummy predictive picture can be predicted from a reference picture. Also, the reference picture can be an intra picture or a predictive picture. Further, at least a portion of the trick mode video signal can be decoded by a remote decoder.

The present invention also concerns a method of performing a trick mode on a video signal containing a plurality of progressively scanned original pictures, which includes the steps of: receiving a trick mode command; and selectively inserting at least one dummy predictive picture in the video signal to form a trick mode video signal. In this particular method, each of the plurality of original pictures can contain a display indicator, and the method can further include the step of selectively modifying the display indicator of at least a portion of the plurality of original pictures to reflect an intended display order each time the selectively inserting step is performed. In addition, the display indicator can be a temporal reference field in which each temporal reference field can have an integer value, and the step of selectively modifying the temporal reference field of at least a portion of the plurality of original pictures can include the step of incrementally increasing by one the integer value of the temporal reference field each time the selectively inserting step is performed. Also, at least a portion of the trick mode video signal can be decoded by a remote decoder.

The invention also concerns a method of decoding a digitally encoded signal. This method includes the steps of: transmitting the digitally encoded signal to a remotely located decoder; and decoding at least a portion of the digitally encoded signal at the remotely located decoder, wherein the digitally encoded signal contains at least one dummy predictive picture and additional pictures selected from the group comprising intra pictures, predictive pictures or bidirectional predictive pictures.

The invention also concerns a system for performing a trick mode on a video signal containing a plurality of progressively scanned original pictures. The system includes: a controller for reading data from a storage medium and outputting the video signal containing the plurality of original pictures; and a processor, wherein the processor is programmed to: in response to a trick mode command, selectively repeat at least one of the original pictures to convert the video signal to a trick mode video signal; and selectively insert at least one dummy predictive picture in the trick mode video signal. The system also includes suitable software and circuitry to implement the methods as described above.

DETAILED DESCRIPTION OF THE PREFERRED EMBODIMENTS

Figure 1:
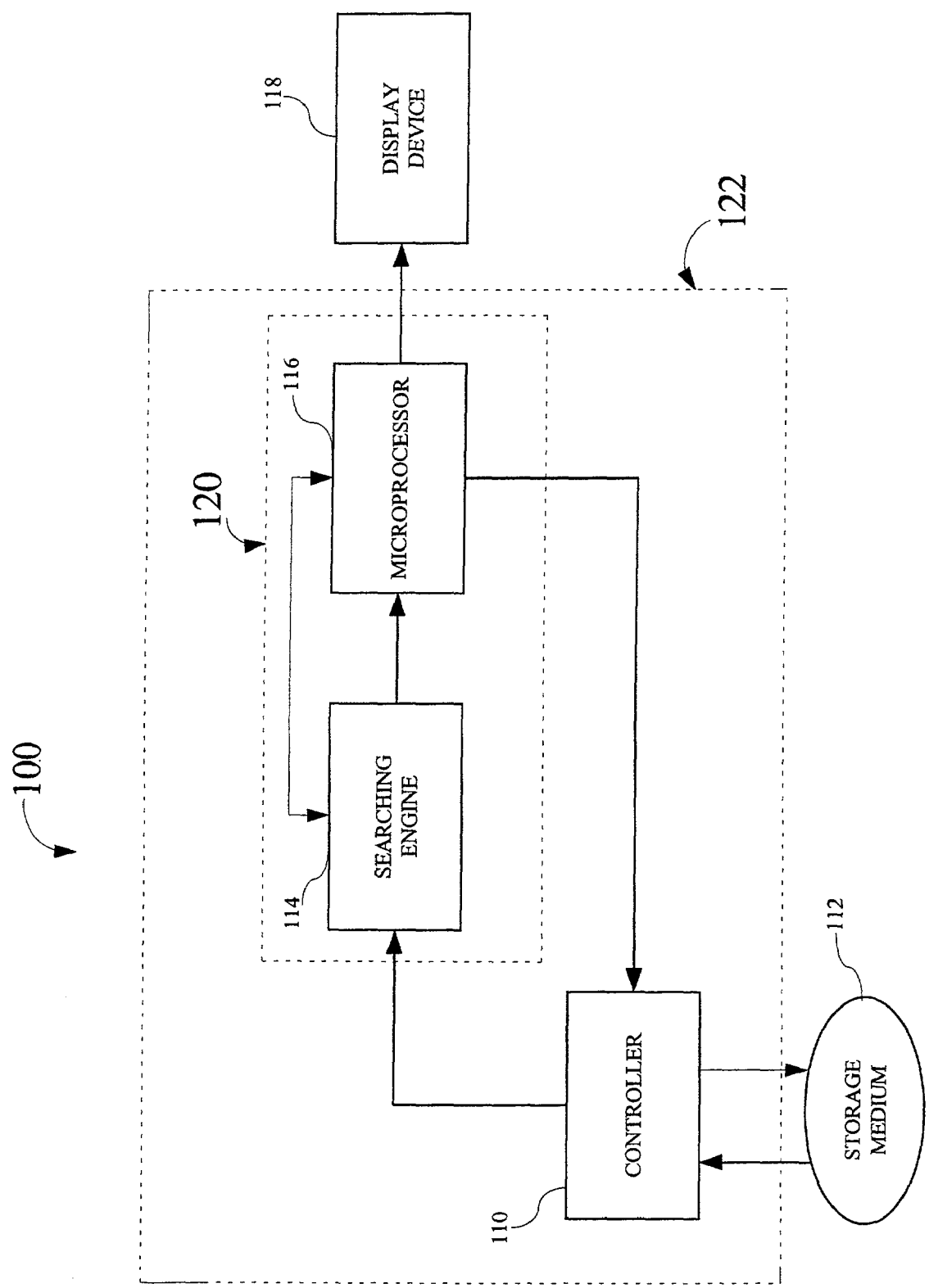
FIG. 1 is a block diagram of a system that can perform a trick mode using dummy predictive pictures in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a searching engine 114, a microprocessor 116 and a display device 118. The searching engine 114 can contain suitable software and circuitry for locating one or more particular types of pictures in a video signal read from the storage medium 112. Control and data interfaces can also be provided for permitting the microprocessor 116 to control the operation of the controller 110 and the searching engine 114. Suitable software or firmware can be provided in memory for the conventional operations performed by the microprocessor 116. Further, program routines can be provided for the microprocessor 116 in accordance with the inventive arrangements.

It should be understood that all or portions of the searching engine 114 and the microprocessor 116 can be a video processor 120 within contemplation of the present invention. Further, all or portions of the controller 110, the searching engine 114 and the microprocessor 116 can be a bitstream source 122 within contemplation of the present invention. In one arrangement, the display device 118 can contain its own decoder (not pictured) for decoding all or a portion of any video signal read from the storage medium 112 and processed by the bitstream source 122. In this particular arrangement, the decoder (not shown) in the bitstream source 122 typically does not decode the video signal read from the storage medium 112. This particular embodiment can be referred to as a remote decoder arrangement. It should be noted, however, that the invention is not limited to this arrangement, as the invention can be practiced in other suitable systems.

In operation, the controller 110 can read a video signal containing a plurality of progressively scanned original pictures from the storage medium 112. For convenience, the phrase "progressively scanned original pictures" will be shortened to "original pictures" throughout the application. In one arrangement, if the microprocessor 116 receives a trick mode command such as a slow motion or freeze command, then the microprocessor 116 can selectively repeat at least one of the original pictures to convert the video signal to a trick mode video signal. Thus, the trick mode video signal can contain the original pictures as well as duplicates of certain original pictures, or repeated original pictures.

In addition, during the trick mode command, the microprocessor 116, can signal the searching engine 114 to locate one or more suitable original pictures in the trick mode video signal. Once a suitable original picture is located, the searching engine 114 can signal the microprocessor 116, and the microprocessor 116 can generate a corresponding dummy P picture. The microprocessor 116 can then selectively insert at least one of the corresponding dummy P pictures such that the dummy P picture is sent to the display device 118. In this arrangement, the dummy P pictures can take the place of one or more of the repeated original pictures such that the dummy P picture is transmitted to the display device 118 and displayed instead of a repeated original picture. It is understood, however, that in lieu of repeating pictures in addition to inserting dummy P pictures, the microprocessor 116 can merely insert dummy P pictures into the video signal read from the storage medium 112 to form a trick mode video signal.

In another aspect of the invention, the microprocessor 116 can monitor the bit rate of the trick mode video signal. If the bit rate of the trick mode video signal exceeds a predetermined threshold, then the microprocessor 116, in conjunction with the searching engine 114, can perform the selectively inserting step discussed above in which at least one dummy P picture can be inserted in the trick mode video signal.

In another arrangement, the microprocessor 116 can modify certain portions of information contained within one or more of the plurality of original pictures contained in the trick mode video signal to reflect an intended display order. This modification step can be performed whether original pictures are repeated or dummy P pictures are inserted in the video signal. The overall operation of the invention will be discussed in greater detail below.

Trick Mode Using Dummy Predictive Pictures

Figure 2:
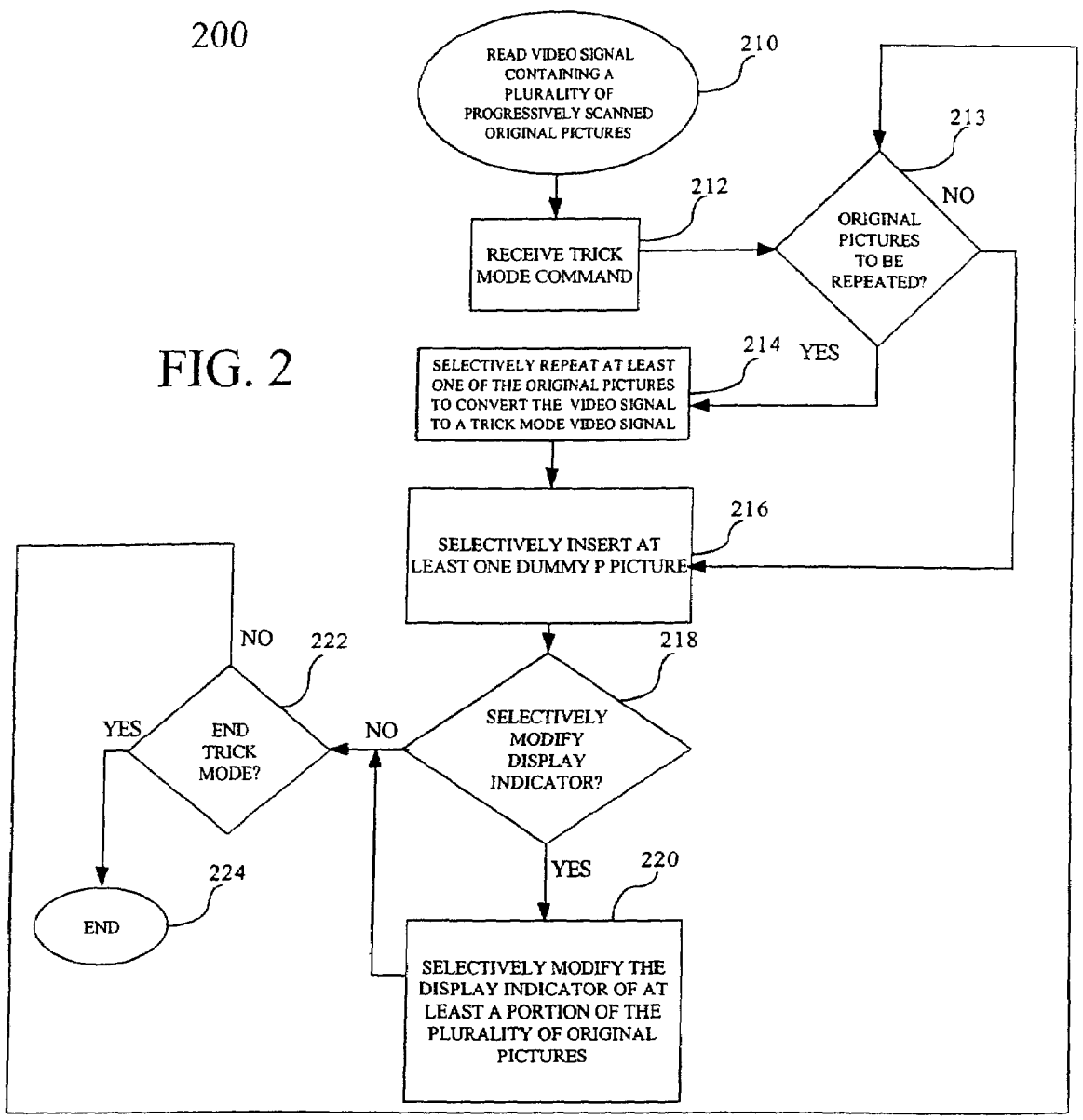
FIG. 2 is a flow chart that illustrates an operation of performing a trick mode using dummy predictive pictures in accordance with the inventive arrangements.

FIG. 2 illustrates a flowchart 200 that demonstrates one way in which a trick mode using dummy P pictures can be performed. In one arrangement, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder. As an example, the bitstream source can be an optical storage medium player or recorder, such as a digital video player or recorder, that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

At step 210, a video signal containing a plurality of progressively scanned original pictures can be read. At step 212, a trick mode command can be received. For purposes of the invention, the trick mode command can be any command in which one or more of the original pictures are to be repeated including a pause or freeze command or a slow motion command. As shown at decision block 213, it can be determined whether at least one of the original pictures is to be repeated. If so, then at least one of the original pictures can be selectively repeated, as shown at step 214. This selective repetition converts the video signal to a trick mode video signal.

If the original pictures are not to be repeated (or resent), then the flowchart 200 can continue at step 216 where one or more dummy P pictures can be selectively inserted in the video signal to form a trick mode video signal. In one arrangement, the insertion of the dummy P pictures can form a slow motion trick mode video signal. In addition, if original pictures are repeated in accordance with step 214, then one or more dummy P pictures can also be selectively inserted into the trick mode video signal containing the repeated original pictures. Thus, the trick mode video signal can contain repeated original pictures, dummy P pictures or a combination thereof.

A dummy P picture is a picture that can be predicted from certain pictures and whose motion vectors and discrete cosine transform (DCT) coefficients are set to zero. As such, a dummy P picture contains very little information. A dummy P picture's primary purpose is to duplicate or repeat the picture from which it was predicted using very few bits. Thus, a dummy P picture is suitable for replacing certain repeated original pictures when those original pictures are to be repeated in the trick mode video signal. In one arrangement, the dummy P pictures can replace one or more of the repeated original pictures such that the dummy P pictures can be transmitted to a remote decoder rather than certain repeated original pictures. This insertion and replacement step may be helpful in keeping a bit rate of the trick mode video signal at a manageable level, as such video signals tend to be elevated because numerous original pictures, particularly those with a large number of bits, are likely to be repeated during the trick mode command.

A picture from which a dummy P picture is predicted is commonly referred to as a reference picture, and a number of the original pictures can be reference pictures. The reference picture can be either an I picture or a P picture that precedes the dummy P picture. As no picture can be predicted from a B picture, it is unnecessary to replace the duplicates or repeats of an original picture if the original picture is a B picture. That is, if the original picture is a B picture, the repeated B pictures do not have to be replaced by dummy P pictures. Repeating B pictures, however, should not cause the bit rate of the trick mode video signal to exceed the maximum limit of the transmission channel, as B pictures typically contain relatively small amounts of encoded data.

The following example illustrates how a dummy P picture can be inserted in a trick mode video signal. If a trick mode command such as a freeze command is received, at least one original picture in the video signal will be repeatedly sent to a display device thereby creating a trick mode video signal. If this particular original picture being repeated is an I picture, then there is a good chance that the bit rate of the trick mode video signal will exceed the maximum bit rate of the transmission channel, as I pictures contain a relatively large amount of encoded data. By inserting dummy P pictures in the trick mode video signal such that the dummy P pictures replace the repeated I pictures, the bit rate of the trick mode video signal can be lowered, as dummy P pictures contain far less encoded data in comparison to an I picture. It is understood, however, that the invention is not limited to this particular example, as the invention can be practiced with other suitable trick modes.

In another embodiment, each of the plurality of original pictures can contain a display indicator. As determined at decision block 218, if the display indicators of these pictures are to be selectively modified, then the display indicator of at least a portion of the plurality of original pictures can be selectively modified, as shown at step 220.

Notably, modifying these display indicators can reflect an intended display order of the plurality of original pictures when an original picture is repeated and when a dummy P picture is inserted in the trick mode video signal. It is understood, however, that this process can be preformed irrespective of whether dummy P pictures are being added during the trick mode. Thus, the step of modifying a display indicator can be performed during a conventional trick mode in which pictures are merely repeated and no dummy P pictures are inserted into the trick mode video signal. Referring back to the flowchart 200, if the display indicators are not to be modified, then the flowchart 200 can continue at step 222.

In one arrangement, the display indicator can be a temporal reference field. A temporal reference field is typically a ten bit field located in the picture header of digitally encoded pictures. Some decoders rely on the temporal reference field to determine when a particular picture in a video signal will be displayed relative to other pictures in the video signal. This field normally has an integer value, which can indicate the order in which a picture is to be displayed. For example, a group of pictures (GOP) generally contains fifteen pictures. The temporal reference field of the first picture in the GOP, i.e., the picture immediately following the GOP header, can have an integer value of zero. The temporal reference field of the next picture to be displayed can have an integer value of one. Thus, the integer value of the temporal reference field for each subsequent picture to be displayed can be increased by one.

When an original picture is repeated or if a dummy P picture is inserted in the trick mode video signal, however, the display order according to the temporal reference fields of the original pictures is no longer valid. Accordingly, the integer value of the temporal reference fields of the original pictures that follow the inserted dummy P pictures or repeated original pictures can be modified to indicate a proper display order. For example, if the first picture in a GOP is sent to the display device and three corresponding dummy P pictures are sent as well (this is in accordance with a one-fourth slow motion playback), then the integer value of the temporal reference field of the original reference picture (assuming that it is the first picture in the GOP to be displayed) can be kept as zero, the temporal reference field of the first dummy P picture can be set to an integer value of one, the temporal reference field of the second dummy P picture can be set to an integer value of two and the temporal reference field of the third dummy P picture can be set to an integer value of three. In addition, the temporal reference field of the next original picture to be displayed can be modified from its original integer value of one to an integer value of four.

This step of incrementally increasing the integer values of the temporal reference fields can continue until the trick mode is rescinded and the temporal reference field of the last picture in the last GOP affected by the trick mode is modified. Once the next GOP is reached, the integer value of the temporal reference field of the first display picture in the new GOP can be zero. Thus, each time a dummy P picture is inserted into the trick mode video signal and each time an original picture is repeated, the integer value of the temporal reference fields of each original picture following the inserted dummy P pictures and the repeated original pictures can be incrementally increased by one through the trick mode GOPs to reflect the intended display order.

The integer value for the temporal reference field can have a maximum value of 1,023. If the integer values for the temporal reference fields of the pictures that make up a GOP (the original pictures plus the dummy P and/or repeated pictures) reach this value and more pictures are to be added to the GOP, then the temporal reference field can merely wrap around and begin again at zero. As an example, if a freeze trick mode is initiated and performed for an extended amount of time, the integer value of the dummy P pictures (or repeat pictures) will eventually reach 1,023. Once that occurs, for the GOP affected by the trick mode to continue, the integer value for the temporal reference field of the next immediate dummy P or repeat picture to be displayed can be set to zero.

Of course, it should be noted that the invention is not limited to the use of a temporal reference field, as any other suitable display indicator can be modified to reflect an intended display order in either of the embodiments discussed above. Also, the wrap around value is by no means limited to 1,023, as other suitable values can be used. Referring back to the flowchart 200, once the display indicator has been selectively modified, the process can continue at step 222. If the trick mode is to continue, then the trick mode can continue at step 213. If not, the process can stop at step 224.

Figure 3:
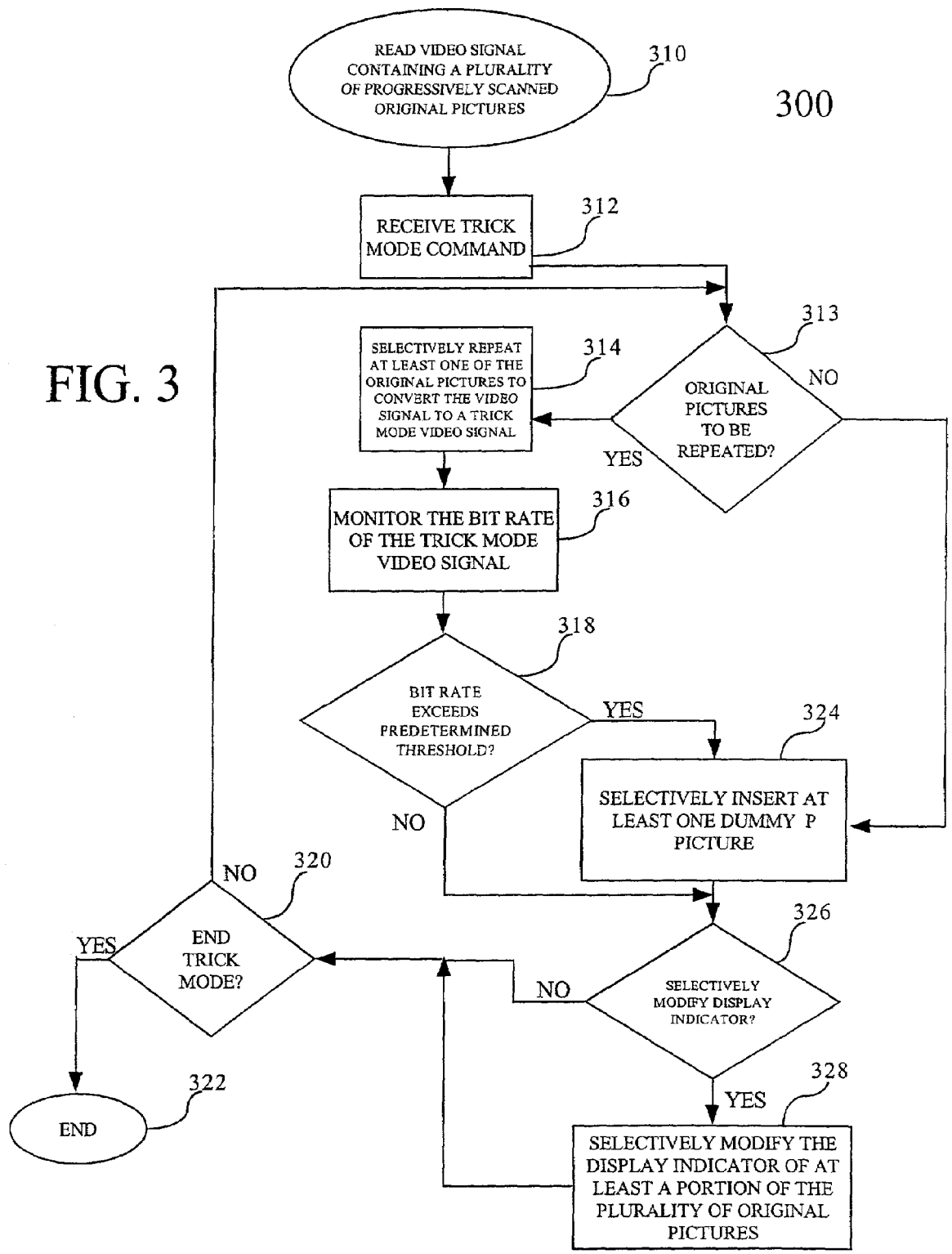
FIG. 3 is a flow chart that illustrates an alternative operation of performing a trick mode using dummy predictive pictures in accordance with the inventive arrangements.

Referring to FIG. 3, a flowchart 300 represents an alternative to the trick mode discussed in the flowchart 200. As shown in flowchart 300, steps 310–314 are nearly identical to steps 210–214 in the flowchart 200 and, accordingly, warrant no discussion here. The only difference is that if no pictures are to be repeated as determined at decision block 313, then the flowchart 300 can continue at step 324. At step 316, during the trick mode command, the bit rate of the trick mode video signal can be monitored. Monitoring the bit rate may be necessary during a trick mode because several pictures in the video signal may be repeated one or more times thereby resulting in an increased bit rate. In certain cases, this increased bit rate may exceed the maximum allowable bit rate for the transmission channel that is carrying the video signal. For purposes of the invention, this maximum allowable bit rate for the transmission channel can be referred to as a predetermined threshold.

At decision block 318, it can be determined whether the bit rate of the trick mode video signal has exceeded this predetermined threshold. If the bit rate has not reached the predetermined threshold, the flowchart 300 can continue to decision block 326. Referring back to step 318, if the bit rate has exceeded the predetermined threshold, then dummy P pictures can be inserted in the trick mode video signal, as shown at step 324. The display indicators of at least a portion of the original pictures can be modified, as shown at steps 326 and 328. The procedures shown in steps 324, 326 and 328 are similar to the corresponding procedures illustrated in the flowchart 200. Thus, the insertion of dummy P pictures can occur based on the monitoring of the bit rate of the trick mode video signal and can be performed if this bit rate exceeds a predetermined threshold. If the trick mode is to continue at decision block 320, the flowchart 300 can resume at step 313. If not, the flowchart 300 can stop at step 322.

Although the present invention has been described in conjunction with the embodiments disclosed herein, it should be understood that the foregoing description is intended to illustrate and not limit the scope of the invention as defined by the claims.

What is claimed is:

1. A method of performing a trick mode on a video signal containing a plurality of progressively scanned original pictures, comprising the steps of:
   in response to a trick mode command, selectively repeating at least one of the original pictures to convert the video signal to a trick mode video signal; and
   selectively inserting at least one dummy predictive picture in the trick mode video signal.

2. The method according to claim 1, further comprising the steps of:
   monitoring the trick mode video signal; and
   wherein the step of selectively inserting at least one dummy predictive picture in the trick mode video signal is done if the bit rate of the trick mode video signal exceeds a predetermined threshold.

3. The method according to claim 1, wherein each of the plurality of original pictures contains a display indicator and the method further comprises the step of selectively modifying the display indicator of at least a portion of the plurality of original pictures to reflect an intended display order when an original picture is repeated or when a dummy predictive picture is inserted in the trick mode video signal.

4. The method according to claim 3, wherein the display indicator is a temporal reference field.

5. The method according to claim 4, wherein each temporal reference field has an integer value and the step of selectively modifying the temporal reference field of at least a portion of the plurality of original pictures comprises the step of incrementally increasing by one the integer value of the temporal reference field each time an original picture is repeated and each time a dummy predictive picture is inserted in the trick mode video signal.

6. The method according to claim 1, wherein each dummy predictive picture is predicted from a reference picture.

7. The method according to claim 6, wherein the reference picture is an intra picture.

8. The method according to claim 6, wherein the reference picture is a predictive picture.

9. The method according to claim 1, wherein at least a portion of the trick mode video signal is decoded by a remote decoder.

10. In a remote decoder arrangement, a method of performing a trick mode on a video signal containing a plurality of progressively scanned original pictures, wherein each of the plurality of progressively scanned original pictures contains a display indicator, comprising the steps of:
    in response to a trick mode command, selectively repeating at least one of the original pictures to convert the video signal to a trick mode video signal;
    monitoring a bit rate of the trick mode video signal;
    selectively inserting at least one dummy predictive picture in the trick mode video signal if the bit rate exceeds a predetermined threshold; and
    selectively modifying the display indicator of at least a portion of the plurality of original pictures to reflect an intended display order when an original picture is repeated or when a dummy predictive picture is inserted in the trick mode video signal.

11. A method of performing a trick mode on a video signal containing a plurality of progressively scanned original pictures wherein each of the plurality of original pictures contains a temporal reference field, comprising the steps of:
- receiving a trick mode command;
- selectively inserting at least one dummy predictive picture in the video signal to form a trick mode video signal; and
- selectively modifying the temporal reference field of at least a portion of the plurality of original pictures to reflect an intended display order each time said selectively inserting step is performed;
- wherein each temporal reference field has an integer value and the step of selectively modifying the temporal reference field of at least a portion of the plurality of original pictures comprises the step of incrementally increasing by one the integer value of the temporal reference field each time said selectively inserting step is performed.

12. The method according to claim 11, wherein at least a portion of the trick mode video signal is decoded by a remote decoder.

13. A system for performing a trick mode on a video signal containing a plurality of progressively scanned original pictures, comprising:
- a controller for reading data from a storage medium and outputting the video signal containing the plurality of original pictures; and
- a processor, wherein the processor is programmed to:
  - in response to a trick mode command, selectively repeat at least one of the original pictures to convert the video signal to a trick mode video signal; and
  - selectively insert at least one dummy predictive picture in the trick mode video signal.

14. The system according to claim 13, wherein the video processor is further programmed to:
- monitor the trick mode video signal; and
- selectively insert at least one dummy predictive picture in the trick mode video signal if the bit rate of the trick mode video signal exceeds a predetermined threshold.

15. The system according to claim 13, wherein each of the plurality of original pictures contains a display indicator and the video processor is further programmed to modify selectively the display indicator of at least a portion of the plurality of original pictures to reflect an intended display order when an original picture is repeated or when a dummy predictive picture is inserted in the trick mode video signal.

16. The system according to claim 15, wherein the display indicator is a temporal reference field.

17. The system according to claim 16, wherein each temporal reference field has an integer value and the step of selectively modifying the temporal reference field of at least a portion of the plurality of original pictures comprises the step of incrementally increasing by one the integer value of the temporal reference field each time an original picture is repeated or when a dummy predictive picture is inserted in the trick mode video signal.

18. The system according to claim 13, wherein each dummy predictive picture is predicted from a reference picture.

19. The system according to claim 18, wherein the reference picture is an intra picture.

20. The system according to claim 18, wherein the reference picture is a predictive picture.

21. The system according to claim 13, further comprising a remote decoder for remotely decoding at least a portion of the trick mode video signal.

22. A remote decoder system for performing a trick mode on a video signal containing a plurality of progressively scanned original pictures, wherein each of the plurality of progressively scanned original pictures contains a display indicator, comprising:
- a controller for reading data from a storage medium and generating the video signal containing the plurality of original pictures; and
- a processor, wherein the processor is programmed to:
  - in response to a trick mode command, selectively repeat at least one of the original pictures to convert the video signal to a trick mode video signal;
  - monitor a bit rate of the trick mode video signal;
  - selectively insert at least one dummy predictive picture in the trick mode video signal if the bit rate exceeds a predetermined threshold; and
  - selectively modify the display indicator of at least a portion of the plurality of original pictures to reflect an intended display order when an original picture is repeated or when a dummy predictive picture is inserted in the trick mode video signal.

23. A system for performing a trick mode on a video signal containing a plurality of progressively scanned original pictures wherein each of the plurality of original pictures includes a temporal reference field comprising:
- a controller for reading data from a storage medium and generating the video signal containing the plurality of original pictures; and
- a processor programmed to:
  - receive a trick mode command;
  - selectively insert at least one dummy predictive picture in the video signal to form a trick mode video signal; and
  - selectively modifying the temporal reference field of at least a portion of the plurality of original pictures to reflect an intended display order each time the processor performs the selectively inserting step;
- wherein each temporal reference field has an integer value and the processor is further programmed to selectively modify the temporal reference field of at least a portion of the plurality of original pictures by incrementally increasing by one the integer value of the temporal reference field each time the processor performs the selectively inserting step.

24. The system according to claim 23, further comprising a remote decoder, wherein the remote decoder decodes at least a portion of the trick mode video signal.

* * * * *